United States Patent
Boulanger et al.

(10) Patent No.: US 10,217,008 B2
(45) Date of Patent: Feb. 26, 2019

(54) METHOD FOR DETECTING FRAUD TO AUTHENTICATE A FINGER

(71) Applicant: Safran Identity & Security, Issy-les-Moulineaux (FR)

(72) Inventors: Jean-Francois Boulanger, Issy-les-Moulineaux (FR); Damien Moriceau, Issy-les-Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 53 days.

(21) Appl. No.: 15/380,974

(22) Filed: Dec. 15, 2016

(65) Prior Publication Data

US 2017/0177960 A1 Jun. 22, 2017

(30) Foreign Application Priority Data

Dec. 18, 2015 (FR) ..................... 15 62737

(51) Int. Cl.
*G06K 9/00* (2006.01)
*G06K 9/52* (2006.01)
(Continued)

(52) U.S. Cl.
CPC .......... *G06K 9/00899* (2013.01); *G01B 11/24* (2013.01); *G06K 9/00087* (2013.01);
(Continued)

(58) Field of Classification Search
CPC .......... G06K 9/00899; G06K 9/00107; G06K 9/00087; G06K 9/52; G01B 11/24; G06T 17/20
See application file for complete search history.

(56) References Cited

U.S. PATENT DOCUMENTS 9,396,382 B2 * 7/2016 Troy ..................... G06K 9/001
2014/0049373 A1 2/2014 Troy et al.

FOREIGN PATENT DOCUMENTS

WO WO 2009112717 A1 9/2009

OTHER PUBLICATIONS

Search Report and Written Opinion in French Application No. 1562737 dated Sep. 1, 2016, with English translation coversheet. 9 pages.

(Continued)

*Primary Examiner* — Tom Y Lu
(74) *Attorney, Agent, or Firm* — Womble Bond Dickinson (US) LLP

(57) ABSTRACT

The invention relates to a method for detecting fraud to authenticate that an object is a human finger from a three-dimensional representation of said object comprising a set of representation points (3) modeling at least a part of the surface of the object, comprising the following steps:
  a) determining at least one principal plane (P) comprising a principal axis in the longitudinal direction of the three-dimensional representation of the object, said principal plane (P) intersecting the representation (1) of the surface of the object along at least one intersection zone,
  b) for each principal plane (P), determining a set of working points (5) from representation points (3) at the intersection zone,
  c) validation that the object is a human finger by implementing a validation process on the position of the working points.

14 Claims, 4 Drawing Sheets

(51) Int. Cl.
*G06T 17/20* (2006.01)
*G01B 11/24* (2006.01)

(52) U.S. Cl.
CPC .......... *G06K 9/00107* (2013.01); *G06K 9/52* (2013.01); *G06T 17/20* (2013.01)

(56) References Cited

OTHER PUBLICATIONS

Huang et al. "3d Fingerprint Imaging System based on Full-Field Fringe Projection Profilometry." Optics and Lasers in Engineering, vol. 52, No. 1 (Jan. 1, 2014). pp. 123-130.
Woodard et al. "Finger Surface as a Biometric Identifier." Computer Vision and Image Understanding, vol. 11, No. 3 (Dec. 1, 2005). pp. 357-384.

* cited by examiner

METHOD FOR DETECTING FRAUD TO AUTHENTICATE A FINGER

TECHNICAL BACKGROUND

The present invention relates to a fraud detection method for authenticating that an object is a human finger. Fingerprint or venous network authentication is one of the techniques used for biometric authentication. An image of an illuminated finger is acquired and analyzed to identify an individual. The most used method consists in acquiring the image of the finger when it is against a surface and in exploiting the optical interactions between the finger and this surface. This is notably the case of the so-called total internal reflection method, better known under the acronym TIR, in which differences in the refractive indices between air and air Human skin to highlight ridges and valleys of fingerprints.

Nevertheless, the need for contact between the finger and the surface poses several problems. The finger must be stationary when acquiring the image to be processed and the process is slow, unsuitable for massive use in places of high traffic, such as airport controls, where the speed of control is important. Moreover, the quality of the image thus acquired depends on the state of the skin of the finger, which may be more or less dry, and the state of the surface, whose repeated contact with fingers can foul it, and therefore requires periodic cleaning.

In addition, the surface contacting the skin of different people, problems of hygiene can arise, exacerbated by the fact that it is the fingers of these people which come into contact with the surface. It may then be necessary to provide equipment for cleaning and/or disinfecting the hands of persons after contact with the surface.

It has therefore been developed devices for acquiring images of fingerprints of at least part of a hand of a user capable of operating without contact. Among the methods developed, acquisition in three dimensions (3D), in which we obtain a 3D model of the finger, is particularly interesting. For example, patent application WO 2009/112717 describes a method in which a three-color light pattern is projected on the surface of the finger and monochrome images acquired in each of the colors projected by a camera makes it possible to reconstitute a model in three dimensions of the finger.

Like any fingerprint acquisition method, it is possible to use decoys, false elements of the human body reproducing the characteristics on the basis of which the analysis of the image is based, such as fingerprints or the venous network of the finger. It is therefore necessary to provide in addition a validation method to validate that the analyzed object is indeed an element of the human body, usually a finger, but it may be the hand as a whole, or another part of the body.

Several methods have been developed to validate or not that an object is an element of the human body, generally making use of various properties of a living finger that are more or less difficult to reproduce. Among these solutions, some aim to highlight the appearance and disappearance of the venous networks as a function of the pressure exerted by the finger. However, these methods cannot be implemented on a contactless sensor.

SUMMARY OF THE INVENTION

The object of the invention is to overcome at least partially these disadvantages and preferentially all of them, and aims in particular to propose a method for detecting fraud making it possible to determine that an object is a human finger without contact with said object, only by analyzing the form of its three-dimensional representation.

To this end, there is provided a fraud detection method for authenticating that an object is a human finger from a three-dimensional representation of said object previously determined by a processing unit from an image of said object acquired by an image acquisition device, said three-dimensional representation comprising a set of representation points modeling at least part of the surface of the object, wherein a processor implements the following steps:

a) determining at least one principal plane comprising a principal axis in the longitudinal direction of the three-dimensional representation of the object, said principal plane intersecting the representation of the surface of the object along at least one intersection zone, b) for each principal plane, determining a set of working points from representation points at the intersection zone, c) validation that the object is a human finger by implementing a validation process on the position of the working points.

The method is advantageously supplemented by the following characteristics, taken alone or in any of their technically possible combinations:

in step a), the principal axis of the three-dimensional representation is determined by analysis in principal components of the distribution of the representation points;

in step b), the working points correspond to the projections on the principal plane of the representation points whose distance from the principal plane is less than a given distance or the working points correspond to the intersections of the principal plane with straight lines connecting two neighboring representation points on the representation of the surface;

in step c), the implementation of the validation process comprises the determination of a regularity criterion representative of the regularity of the distribution of the working points on the principal plane from the distances of the working points relative to a reference line defined from said working points, and comparing this regularity criterion with at least one regularity threshold;

the regularity criterion is compared with two different thresholds of regularity and the object is validated as a human finger when the regularity criterion is included between the two regularity thresholds;

in step a), a plurality of principal planes are determined, and either said principal planes contain the principal axis, or a single principal plane contains the principal axis and the other principal planes are parallel to said principal plane containing the principal planes, and steps b) and c) are performed for each principal plane;

step a) comprises determining a plurality of principal planes comprising said principal axis, each of said principal planes intersecting the representation of the surface of the object, step b) comprises the determination of secondary planes intersecting the principal axis, said secondary planes defining sections distributed in the direction of the principal axis, working points being associated with each of said sections, step c) comprises the determination of distances and the validation process involves a validation criterion determined on the basis of the evolution, according to the sections, of distances calculated from the working points, said validation criterion being compared to a validation threshold;

the secondary planes are perpendicular to the principal axis and spaced from one another in the direction of the principal axis by a fixed distance;

the working points are determined from the intersection between the representation of the surface of the object, said principal planes and said secondary planes;

step c) comprises calculating distances between neighboring working points belonging to the same intersection between the representation of the surface of the object and a secondary plane, and the validation process involves a validation criterion determined from the evolution of these distances according to the sections;

step c) comprises calculating the distances to the principal axis of the working points and the validation process involves a validation criterion determined from the evolution of these distances to the principal axis of the points of the different sections;

the method further comprises a flatness test in which a regression plane is determined from working points corresponding to representation points, at least one flatness criterion is determined from the distances between said regression plane and the working points from which said regression plane has been determined, and the validation process comprises a comparison between the flatness criterion and the reference plane.

The invention also relates to a computer program product comprising program code instructions for executing the steps of the method according to any of the embodiments of the invention when said program is executed by a computer.

The invention also relates to a system for biometric analysis of an object to be authenticated as a human finger, comprising an image acquisition device adapted to acquire at least one image of an object to be authenticated as a human finger and a processing unit for determining a three-dimensional representation of said object from said image, said system also comprising a processor configured to implement the fraud detection method according to an embodiment of the invention.

BRIEF DESCRIPTION OF THE DRAWINGS

The invention will be better understood from the following description, which relates to embodiments and variants according to the present invention, given as non-limiting examples and explained with reference to the accompanying schematic drawings, wherein.

DETAILED DESCRIPTION

As mentioned above, fraud used to deceive biometric identification generally involves decoys, false elements of the human body, which aim to reproduce their characteristics. The simplest form to defraud a biometric sensor based on the analysis of the surface of a human finger is to present to the sensor a paper reproduction of a human finger with certain biometric characteristics. Thus, in the usual case of fingerprint detection, it is a question of presenting a photograph, presented flat or wrapped around a finger, on which is reproduced a finger with its fingerprints. A more advanced form consists in arranging, on the surface of a finger presented to the sensor, a lure made of silicone or other similar material such as gelatin or latex, said lure reproducing fingerprints.

The aim of the invention is to detect attempts at fraud by analyzing the geometry of the surface of the object presented by means of its three-dimensional representation. A three-dimensional representation of an object is understood to mean any type of representation in three dimensions of the surface of said object. In particular, the three-dimensional representation can be a mesh composed of a set of polygons such as triangles, be a cloud of points, or be defined by a parametric surface.

Spatial geometrical data representative of this three-dimensional representation, corresponding to the elements of the three-dimensional representation used for its calculation and representation, or derived from it, will be referred to as representation points. Thus, the representation points can correspond, for example, to the points constituting a surface of the three-dimensional representation, to the vertices of the polygons of a mesh, to the points constituting the lines connecting these polygons, to the points of a cloud of points or constituting the lines linking them.

Figure 1:
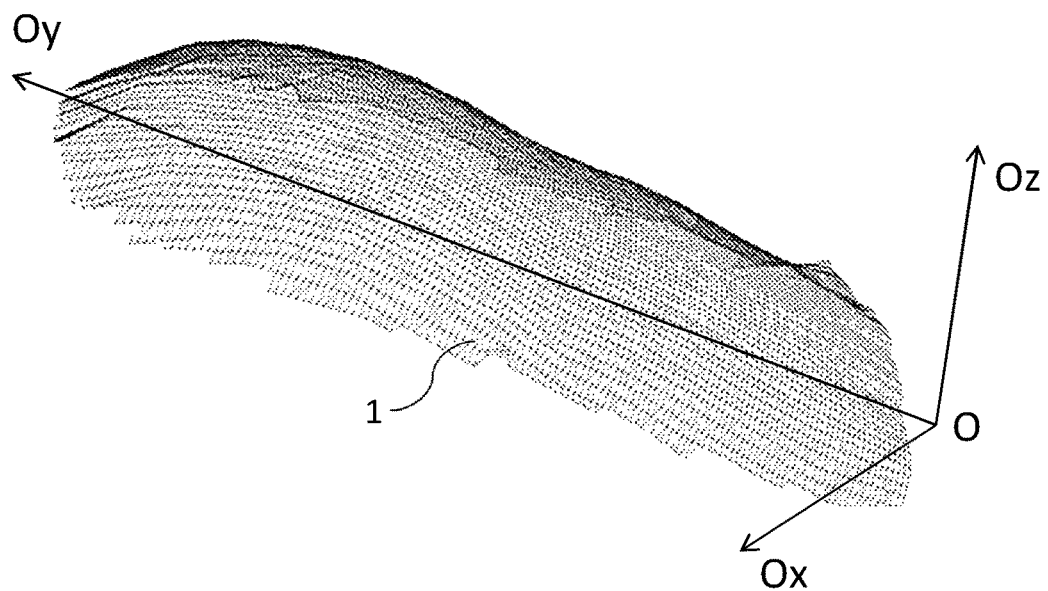
FIGS. 1 and 2 illustrate examples of three-dimensional representations of the surface of a finger and of a wound photograph, respectively.
Figure 2:
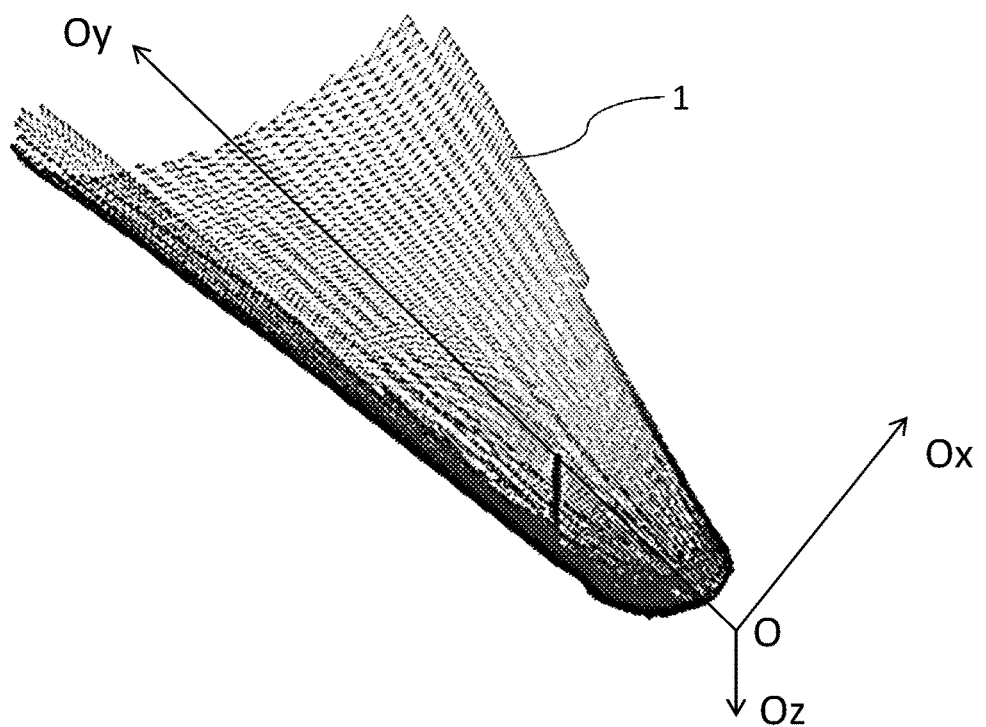

The three-dimensional representation thus comprises a set of representation points modeling at least a part of the surface of the object and the authentication of the object as human finger is based on the geometry of the distribution of the representation points. FIGS. 1 and 2 illustrate examples of three-dimensional representations respectively of the surface of a human finger and of the surface of a paper fraud wound in the form of a cylinder. In these two cases, they are meshes composed of a set of triangular facets whose vertices are constituted by points of representations whose spatial coordinates are known.

As indicated above, the three-dimensional representation of the object can be determined by a processing unit from an image acquired by an image acquisition device adapted to acquire at least one image of an object to be authenticated as a human finger. The following method can be implemented by a processor configured to implement said method. The processor may be part of a computer dedicated to the implementation of the processing, or may be part of a system for biometric authentication of an object to be authenticated as a human finger, comprising said image acquisition device and the processing unit, and the processor can be part of the processing unit.

Since a human finger can have multiple shapes, it is more reliable to demonstrate the particular forms that different types of fraud can take with respect to the geometric features of a human finger than to determine the authentic characteristics of a human finger that a fraud would not present. For example, if the representation of the object has a flat surface, it is probably a paper fraud, in which a flat photograph is presented to the sensor. However, in the analysis of a finger, it is possible to exploit the geometric features of a human finger in order to reinforce the reliability of the detection of the fraud.

Indeed, a finger has a generally cylindrical shape, extending along an axis of revolution, with one end closing by a non-developable surface of semi-spherical type. Thus, in the first step a) of the method, a principal axis in the longitudinal direction of the representation of the object is first determined from the representation points. For example, it is possible to implement a principal component analysis of the distribution of representation points to determine this principal axis. The principal axis is the longitudinal axis in which a finger extends.

It is possible to change the reference frame in which the coordinates of the representation points are expressed, so that one of the axes of the reference frame is the principal axis thus determined, or at least collinear to the latter, in order to simplify the calculations. Another axis may be that of the imager having taken the picture from which the three-dimensional representation is drawn. Preferably, this is an orthogonal reference frame. By way of example, in FIGS. 1 and 2, Oy corresponds to the principal axis, Ox corresponds to an axis orthogonal to the principal axis Oy and to the axis of sight (or axis of the imager), and Oz an axis orthogonal to Ox and Oy.

One seeks to analyze the regularity or the flatness of the representation of the surface of the object to verify that it is not a fraud. For this purpose, the intersection of a plane containing the principal axis and the representation of the surface of the object is used to determine points to be analyzed, called working points.

Figure 3:
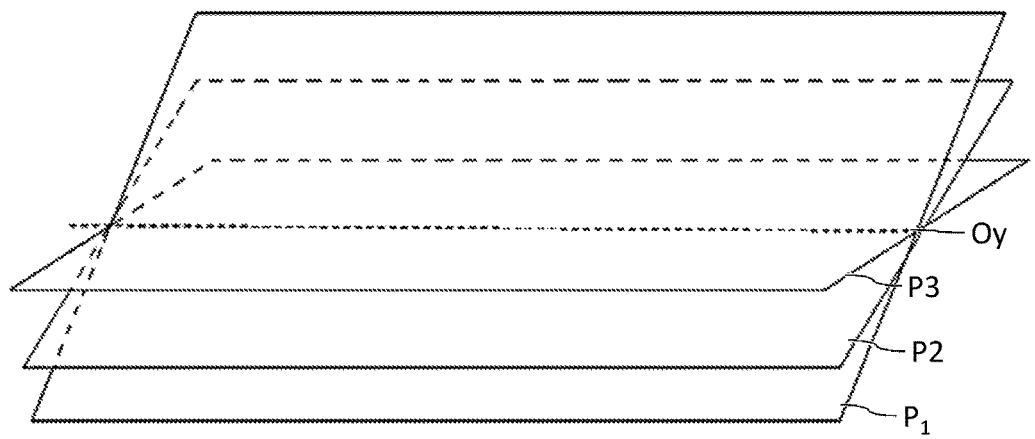
FIGS. 3 and 4 illustrate examples of determination of principal planes.
Figure 4:
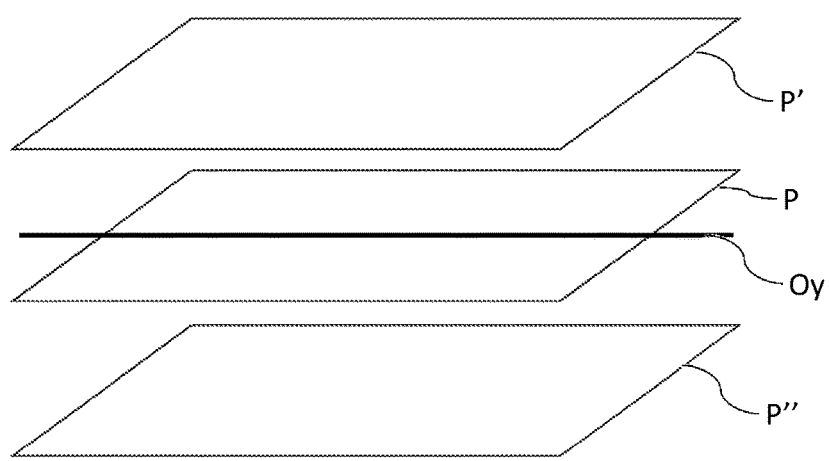

Thus, in step a), at least one principal plane comprising said principal axis is determined, said principal plane intersecting the representation of the surface of the object along at least one intersection zone. With reference to FIGS. 3 and 4, in order to make the following analysis more reliable, it is possible to determine a plurality of principal planes P, each of said principal planes P intersecting the representation of the surface of the object. In the example of FIG. 3, the principal planes P each comprise the principal axis Oy and are intersecting at this principal axis Oy and are distributed angularly by rotation about this principal axis Oy. In the example of FIG. 4, a single principal plane P contains the principal axis Oy, the other principal planes P' and P'' are parallel to this principal plane P containing the principal axis Oy.

Figure 5:
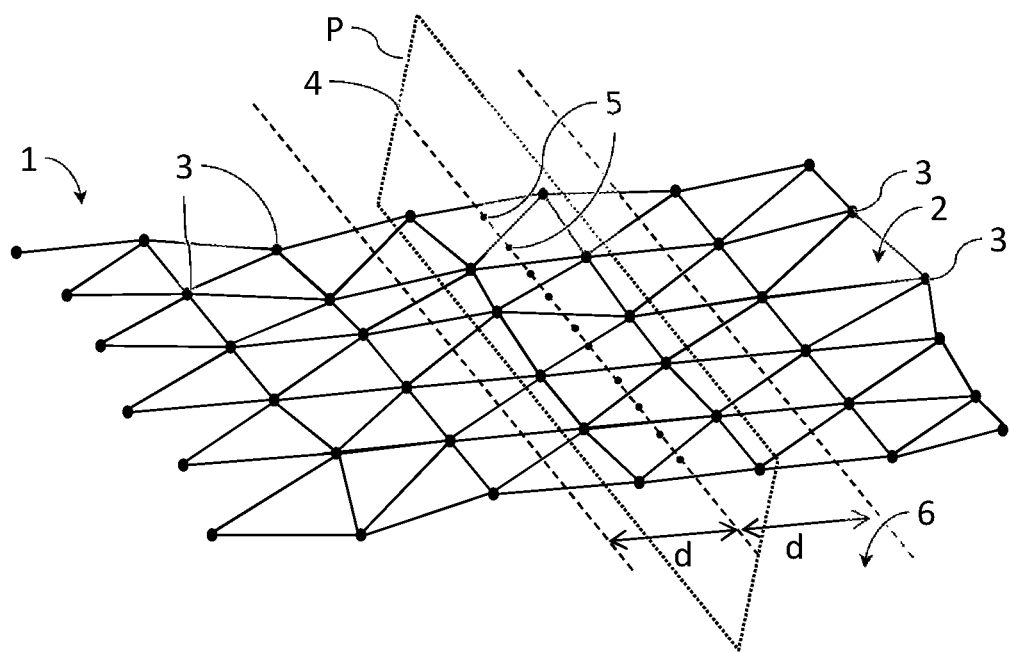
FIGS. 5 and 6 illustrate examples of determination of working points at an intersection zone between a principal plane and the surface of a three-dimensional representation of the surface of an object.
Figure 6:
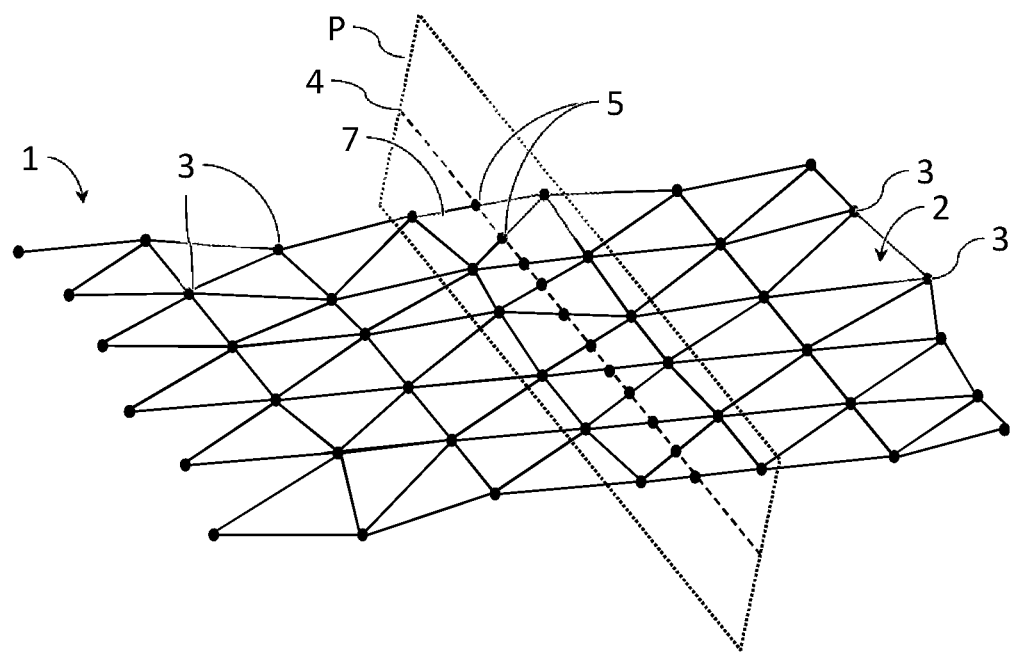

By way of illustration, FIGS. 5 and 6 show a partial view of an intersection zone, at which the principal plane P intersects a representation 1 of the surface of an object. This representation is here a mesh of triangular facets 2 whose vertices are the representation points 3. The principal plane P intersects the representation 1 at the level of an intersection line 4.

In a step b), for each principal plane P, a set of working points is determined from representation points at the intersection zone, that is to say close to the intersection zone. The determination of the working points is done so as to allow the analysis of the geometry of the representation 1 of the surface of the object. Several solutions are possible. When the working points constitute a surface, it is possible to calculate the intersection of this surface with the principal plane P and to select the representation points at this intersection as working points. More generally, however, the three-dimensional representation is composed of representation points that do not form a continuous surface.

As shown in FIG. 5, the working points 5 may correspond to the projections on the principal plane P of the representation points 2, the distance of which from the principal plane is smaller than a given distance, at least in one direction. For this purpose, the intersection zone 6 extends on both sides of the principal plane P over a distance d and the representation points 5 located in this intersection zone 6 are projected orthogonally on the principal plane 5.

Another solution is to define the working points 5 as corresponding to the intersections of the principal plane P with straight lines 7 connecting two neighboring representation points 3 on the representation 1 of the surface of the object, as illustrated in FIG. 6. The lines 7 are those of the mesh, and therefore correspond to the representation 1 of the surface of the object, but can be recreated, for example from a cloud of points.

Once the working points 5 have been determined, a reference line is defined on the basis of these working points 5. This reference line is representative of the spatial distribution of the working points and serves to estimate the regularity of these points by studying their dispersion with respect to said reference line. The reference line can be a regression line, calculated by the implementation of a linear regression or by a principal component analysis, insofar as all the working points belong to the plane P. Other more complex types of regression can be used, such as polynomial regression of degree n, a segmented regression defining a set of segments, etc. . . . .

The validation process for validating that the object is a human finger is implemented on the position of the working points 5. Here, this process involves the distances of the working points from the reference line. It is possible, for example, to establish a regularity criterion of the representation 1 of the surface of the object along the principal axis Oy of these distances, in particular by considering their mean or their maximum value.

By way of example, by noting R a regularity criterion, it can consist in the average of these distances:

$$R = \frac{1}{M}\sum_{i=1}^{M} r_i$$

or the square of these distances:

$$R = \frac{1}{M}\sum_{i=1}^{M} r_i^2$$

where M is the number of working points 5, and $r_i$ is the distance from a working point to the reference line. Other equivalent regularity criteria may be used.

The regularity criterion, for example the one described above, is then compared with at least a first regularity threshold, and if, in absolute value, it is below this threshold, a sign of excessive regularity, this indicates that the object is not an authentic finger but a decoy, probably a wound photograph. Thus, in order for the object to be validated as a human finger, the regularity criterion must exceed this first regularity threshold. The first regularity threshold can be determined empirically on the basis of representations of authentic fingers and decoys. Moreover, it may be constant or depend on parameters, such as the distance d over which the intersection zone 6 extends, or else the fineness of the mesh of the three-dimensional representation 1.

Alternatively, or in addition, it is possible to compare the regularity criterion with at least one second regularity threshold, and if, in absolute value, it is above this threshold, indicating too great an irregularity, this indicates that the object is not an authentic finger but a decoy. Indeed, when a fraud consists in sticking a material such as a modeling clay, silicone or latex, carrying biometric information of another person, such as fingerprints, the addition of this material generally creates a physical discontinuity resulting in an irregularity of the three-dimensional representation of the surface of the object. Thus, in order for the object to be validated as a human finger, the regularity criterion must be below this second regularity threshold. As for the first regularity threshold, the second regularity threshold can be determined empirically on the basis of representations of authentic fingers and decoys. Moreover, it may be constant or depend on parameters, such as the distance d over which the intersection zone 6 extends, or else the fineness of the mesh of the three-dimensional representation 1.

Thus, the regularity criterion can be compared with two different thresholds of regularity, and the object is validated as a human finger when the regularity criterion is included between the two thresholds of regularity.

In the case of using several principal planes P, such as those illustrated in FIGS. 3 and 4, it is possible to determine a set of working points for each intersection of a principal plane P with the representation 1 and to determine a regularity criterion Rp for each one of these sets of working points. These regularity criteria can be individually compared with a regularity threshold, or it is possible to construct an overall regularity criterion and compare it with at least an overall regularity threshold. For example, the global regularity criterion $R_G$ may be the average of the regularity criteria $R_p$:

$$R_G = \frac{1}{N}\sum_{p=1}^{N} R_p$$

with N the number of principal planes. The global regularity criterion $R_G$ can be constructed from other notions than the mean, such as the median or the maximum value of the regularity criteria. It is also possible to take indicators derived from the regularity criteria, such as for example the square of these.

Figure 7:
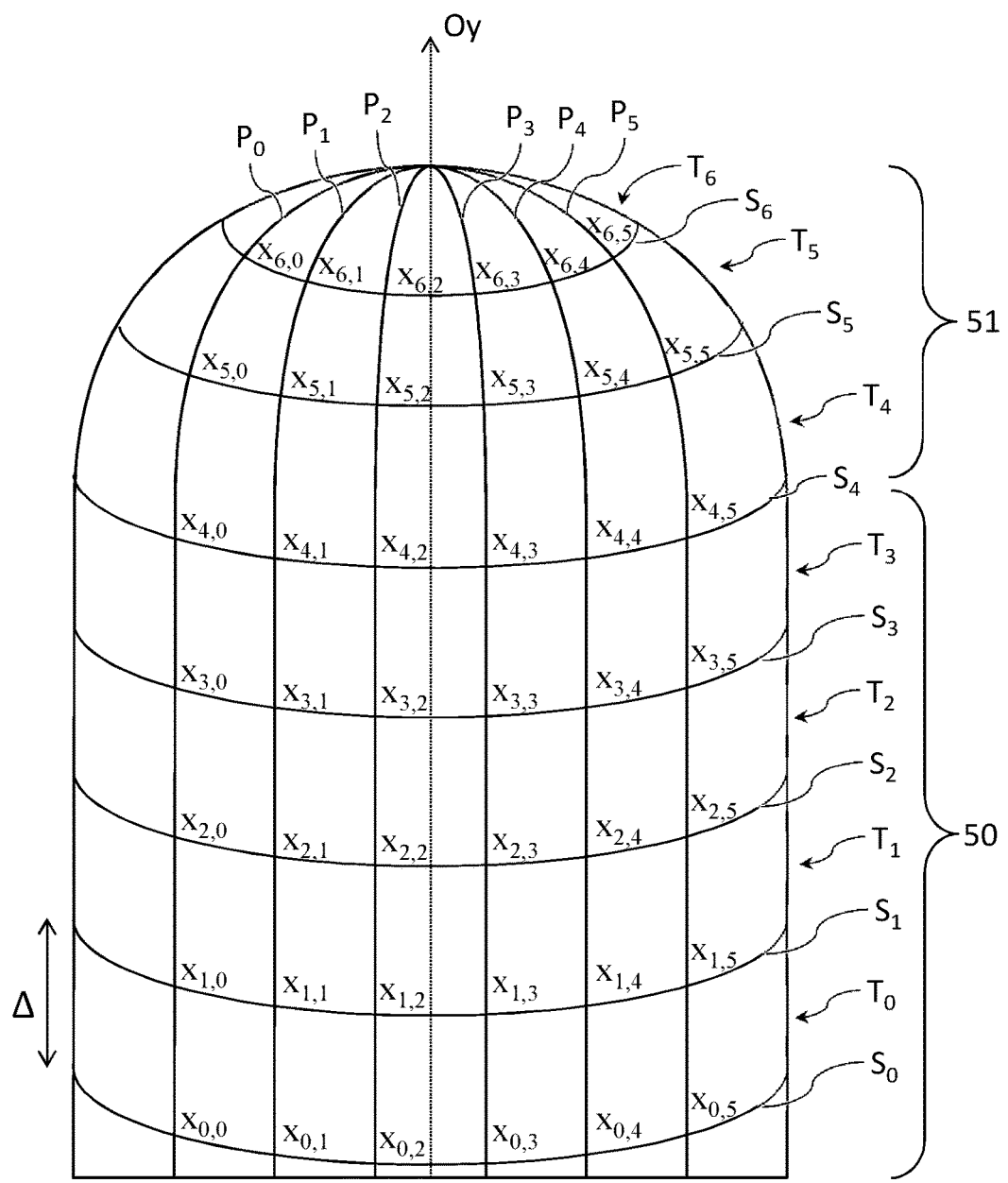
FIG. 7 illustrates an example of determination of working points on the surface of a three-dimensional representation of the surface of an object.

As previously stated, a finger is characterized not only by its cylindrical shape, but also by its end which corresponds to a non-developable surface. With reference to FIG. 7, the three-dimensional representation of a finger comprises, schematically, a cylindrical portion 50, at the level of which a finger has a section with little variation, and an end 51, at the level of which the finger has a generally semi-spherical shape, and in which its section, along the principal axis Oy, decreases. For example, by cutting a finger in the width direction, i.e. perpendicular to the principal axis, at the level of the last phalanx, a generally semi-spherical bell shape is obtained. The validation process can exploit this feature to detect fraud and distinguish an authentic finger.

To this end, step a) comprises determining a plurality of principal planes including the principal axis Oy, each of said principal planes $P_i$ intersecting the representation of the surface of the object. FIG. 3 illustrates an example of such principal planes $P_i$. Only the intersections of the principal planes $P_i$ with the representation of the surface of the object are shown in FIG. 7.

Step b) comprises the determination of secondary planes $S_j$ intersecting the principal axis $O_y$, said secondary planes $S_j$ defining sections $T_j$ distributed in the direction of the principal axis, of the working points being associated with each of said sections. Step c) then comprises the determination of distances and the validation process involves a validation criterion determined on the basis of the evolution, according to the sections, of distances calculated from the working points, said validation criterion being compared to a validation threshold.

More specifically, in one embodiment, step b) comprises the determination of secondary planes Sj perpendicular to the principal axis $O_y$, and spaced from one another in the direction of the principal axis $O_y$ by a fixed distance Δ. Only the intersections of the secondary planes $S_j$ with the representation of the surface of the object are shown in FIG. 7. The secondary planes $S_j$ define sections $T_j$ of the representation surface distributed in the direction of the principal axis Oy, the section $T_j$ being defined between the secondary planes $S_j$ and $S_{j+1}$. The working points $x_{j,i}$ are determined from the intersections between the representation of the surface of the object, said principal planes $P_i$, and the secondary planes $S_j$. For example, the working point $x_{2,4}$ corresponds to the intersection between the representation of the surface of the object, the principal plane $P_4$ and the secondary plane $S_2$.

The validation process in step c) then aims to studying how the working points at the end 51 of a finger come closer, with respect to each other or with respect to the principal axis $O_y$, a feature that would not be exhibited by a lure such as a paper wrapped around a finger.

To study the closeness between them of these working points at the end 51 of a finger, step c) comprises the calculation of distances between neighboring working points $x_{j,i}$ belonging to the same intersection between the representation of the surface of the object and a secondary plane $S_j$. Thus, the validation processing takes into account the distance between the working point $x_{j,i}$ and the working point $x_{j,i+1}$, denoted $d(x_{j,i}, x_{j,i+1})$. More specifically, the validation processing involves a validation criterion determined from the evolution of these distances according to the sections $T_j$, said validation criterion being compared with a validation threshold. For example, the validation criterion may take into account the difference between two of these neighboring distances in the direction of the principal axis $O_y$:

$$d(x_{j+1,i}, x_{j+1,i+1}) - d(x_{j,i}, x_{j,i+1})$$

This difference indicates the variation of the distance between two working points at the two ends of a section $T_j$. Preferably, it is the average, or an equivalent indicator, of all of these differences for a section $T_j$ that is taken into account, to give a validation criterion $D_j$ indicating the variation of inter-point distance on the section $T_j$ between the secondary planes $S_j$ and $S_{j+1}$:

$$D_j = \frac{1}{N-1}\sum_{i=0}^{N-1}[d(x_{j+1,i}, X_{j+1,i+1}) - d(x_{j,i}, x_{j,i+1})]$$

with N the number of principal planes $P_i$.

In a similar way, it is possible to determine a circle that best approximates the working points in each section $T_j$ and the validation criterion $D_j$ can be constructed from the study of the variation in the radii of these circles.

The validation criterion can be compared directly with a validation threshold representative of the expected variation of a human finger in order to be able to validate or not the authenticity of the object. By comparing inter-point distances on either side of a section $T_j$ in the direction of the principal axis $O_y$, it would be necessary for a human finger to notice a decrease in these distances in the direction going from the cylindrical part 50 at the end 51. For example, the criterion $D_j$ presented above is normally negative for an authentic human finger. Thus, if the criterion $D_j$ is above a validation threshold, for example taken at zero, or close to zero in order to allow a certain tolerance, this is the sign of a non-decreasing of the section of the object in the direction of the principal axis $O_y$, and this indicates that the object is not an authentic finger but a fraud, probably a photograph wrapped around a finger. Thus, in order for the object to be validated as a human finger, the regularity criterion must be below the validation threshold, which can be empirically specified on the basis of representations of authentic fingers and decoys.

Alternatively, or in addition, in order to demonstrate the approximation of these working points $x_{j,i}$ with respect to the principal axis at the end 51 of a finger, step c) comprises calculating the distance to the principal axis $O_y$ of the working points $x_{j,i}$, and the validation process involves a validation criterion determined from the evolution of these distances to the principal axis $O_y$ of the working points $x_{j,i}$ of the different Sections $T_j$, said validation criterion being compared with a validation threshold.

More precisely, an indicator is calculated of the distance to the principal axis $O_y$ of the working points $x_{i,j}$ belonging to the same intersection between the representation of the surface of the object and a secondary plane $S_j$, for example the average or another location criterion making it possible to distinguish a progressive difference such as the variance or the standard deviation, and comparing the indicators of the points situated on either side of a section $T_j$. A validation criterion of the following type is thus obtained:

$$D_j = \frac{1}{N}\sum_{i=0}^{N-1} d(x_{j,i}, Oy) - \frac{1}{N}\sum_{i=0}^{N-1} d(x_{j+1,i}, Oy)$$

with N the number of principal planes Pi, Oy the principal axis, and $d(x_j, i, Oy)$ the distance between the working point $x_{j,i}$ and the principal axis Oy.

As before, the validation criterion can be compared directly with a validation threshold representative of the expected variation of a human finger in order to be able to validate or not the authenticity of the object. By comparing the distances between the working points $x_{j,i}$ and the principal axis $O_y$, on either side of a section $T_j$ in the direction of the principal axis $O_y$, a human finger should be exhibit a decrease of these distances. For example, the validation criterion $D_j$ constructed from the distances to the principal axis $O_y$ presented above is normally negative for an authentic human finger.

Thus, if the criterion $D_j$ is above a validation threshold, for example taken at zero, or close to zero in order to allow a certain tolerance, this is the sign of a non-decreasing of the section of the object in the direction of the principal axis $O_y$, and this indicates that the object is not an authentic finger but a fraud, probably a wound photograph, or another type of fraud having difficulty covering the phalanx of the finger homogeneously. Thus, in order for the object to be validated as a human finger, the regularity criterion must be below the validation threshold, which can be determined empirically on the basis of representations of authentic fingers and fraud.

Moreover, the fraud detection method can also exploit the flatness of the representation of the surface of the object. It is then necessary to compare the representation of the surface of the object or a part thereof with a reference plane that minimizes the distance between working points corresponding to representation points, and said plane of regression.

It is possible to select the set of representation points as working points or to divide the representation of the surface into subset, for example of an area of 1 to 10 mm², and selecting the representation points of a subset as working points.

The reference plane can be for example a regression plan determined by a principal component analysis, a least squares method on the working points, or else by a polynomial regression. At least one flatness criterion is then determined, said flatness criterion representative of the flatness of the distribution of the working points and calculated on the basis of the distances between the working points and the reference plane, which is compared with at least one flatness threshold.

In the case where the working points correspond to representation points representing a large part of the representation of the surface of the object, for example all or at least the majority of the representation points, the fact that the working points are close to the reference plane indicates a high overall flatness of the representation of the surface of the object. The object is then probably a flat photograph, since a finger has a globally cylindrical shape.

Conversely, in the case where the working points correspond to representation points representing a small portion of the representation of the surface of the object, for example one of the subset mentioned above, the fact that the working points are spaced apart from the reference plane indicates a low local flatness of the representation of the surface of the object. However, the surface of an authentic finger, with a small surface area of less than 10 mm², is sufficiently regular to be able to be estimated locally by a plane. Consequently, the low local flatness corresponds to an irregularity indicating the presence of an added material, such as a silicone decoy or other similar material such as gelatin or latex.

Therefore, it is possible to determine an overall flatness criterion and a local flatness criterion. The determination of the overall flatness criterion involves working points corresponding to representation points representing a large part of the representation of the surface of the object, for example all or at least the majority of the representation points. The overall flatness criterion is constructed from an indicator of the distances between the working points and the reference plane, preferably the average of the distances, or the median, the maximum value, etc. . . . for example with the average, the overall flatness criterion $D_g$ takes the following form:

$$D_g = \frac{1}{N}\sum_{i=1}^{N} d(x_i, R)$$

where N is the number of working points and $d(x_i, R)$ is the distance between the working point $x_i$ and the reference plane R.

This global flatness criterion $D_g$ is then compared with an overall flatness threshold. The latter may correspond to a value representative of a high flatness, and therefore assume a low value, for example less than three times an estimated margin of error. It can also be determined empirically on the basis of representations of authentic fingers and flat frauds. The fact that the overall flatness criterion $D_g$ is less than the global flatness threshold indicates that the surface of the representation of the object is too flat to be an authentic human finger. Conversely, the fact that the global flatness criterion $D_g$ is greater than the global flatness threshold indicates that the surface of the representation of the object is sufficiently curved to correspond to an authentic human finger and therefore does not correspond to a flat fraud.

The determination of the criterion local flatness involves working points corresponding to representing a small portion of the representation of the surface of the object, for example one of the subset mentioned above. The local flatness criterion is constructed from an indicator of the distances between the working points and the reference plane, preferably the average of the distances, or the median, the maximum value, etc. . . . for example with the average, the local flatness criterion $D_l$ takes the following form:

$$D_l = \frac{1}{N}\sum_{i=1}^{N} d(x_i, R)$$

where N is the number of working points and $d(x_i, R)$ is the distance between the working point $x_i$ and the reference plane R.

This local flatness criterion $D_l$ is then compared with a local flatness threshold. This may correspond to a value representative of a high local flatness, and therefore assume a low value, depending in particular on the area retained for the treated subset. It can also be determined empirically on the basis of representations of authentic fingers and flat frauds. The fact that the local flatness criterion $D_g$ is greater than the local flatness threshold indicates the presence of an irregularity likely to correspond to the presence of a fraud. Conversely, the fact that the local flatness criterion $D_g$ is lower than the local flatness threshold indicates that the surface of the representation of the object is sufficiently flat to correspond to the local regularity of an authentic human finger.

Insofar as the local flatness is estimated only for a subset of the surface of the representation of the object, this local flatness test is preferably implemented for a plurality of subsets, preferably all of the surface being treated by subsets.

The invention also relates to a computer program product comprising program code instructions for performing the steps of the method according to any of the previously described embodiments when said program is executed by a computer.

The invention is not limited to the embodiment described and shown in the accompanying figures. Modifications remain possible, in particular from the point of view of the constitution of the various technical characteristics or by substitution of technical equivalents, without thereby departing from the field of protection of the invention.

The invention claimed is:

1. A method of detecting fraud to authenticate that an object is a human finger from a three-dimensional representation of said object previously determined by a processing unit from an image of said object acquired by an image acquisition device, said three-dimensional representation comprising a set of representation points modeling at least a part of the surface of the object, wherein a processor implements the following steps:
a) determining at least one principal plane comprising a principal axis in the longitudinal direction of the three-dimensional representation of the object, said principal plane intersecting the representation of the surface of the object along at least one intersection zone,
b) then, for each principal plane, determining a set of working points from representation points at the intersection zone,
c) validating the object as one of a human finger and other than a human finger by implementing a validation process on the position of the working points.

2. The method according to claim 1, wherein in step a), the principal axis of the three-dimensional representation is determined by principal component analysis of the distribution of the representation points.

3. The method as claimed in claim 1, wherein, in step b), the working points correspond to the projections on the principal plane of the representation points that have a distance from principal plane less that a given distance or the working points correspond to the intersections of the principal plane with straight lines connecting two neighboring representation points on the representation of the surface.

4. The method according to claim 1, in which, in step c), the implementation of the validation process comprises the determination of a regularity criterion representative of the regularity of the distribution of the working points on the plane from the distances of the working points with respect to a reference line defined from said working points, and comparing this regularity criterion with at least one regularity threshold.

5. The method according to claim 4, wherein the regularity criterion is compared with two different regularity thresholds and the object is validated as a human finger when the regularity criterion is comprised between the two regularity thresholds.

6. The method of claim 1, wherein in step a) a plurality of principal planes are determined and either said principal planes contain the principal axis or a single principal plane contains the principal axis and the other principal planes are parallel to said principal plane containing the principal axis, and steps b) and c) are performed for each principal plane.

7. The method as claimed in claim 1, wherein
Step a) comprises determining a plurality of principal planes including said principal axis, each of said principal planes intersecting the representation of the surface of the object,
Step b) comprises the determination of secondary planes intersecting the principal axis, said secondary planes defining sections distributed in the direction of the principal axis, working points being associated with each one of said sections,
Step c) comprises the determination of distances and the validation process involves a validation criterion determined on the basis of the evolution, according to the sections, of distances calculated from the working points, said validation criterion being compared to a validation threshold.

8. The method as claimed in claim 7, wherein the secondary planes are perpendicular to the principal axis and are spaced from each other in the direction of the principal axis by a fixed distance.

9. The method according to claim 7, in which the working points are determined from the intersection between the representation of the surface of the object, said principal planes and said secondary planes.

10. The method according to claim 7, in which step c) comprises calculating distances between neighboring working points belonging to the same intersection between the representation of the surface of the object and a secondary plane, and the validation process involves a validation criterion determined from the evolution of these distances according to the sections.

11. The method according to claim 7, in which step c) comprises calculating the distance to the principal axis of the working points, and the validation process involves a validation criterion determined from the evolution of these distances of the working points of the different sections to the principal axis.

12. The method according to claim 1, further comprising a flatness test, in which a regression plane is determined from working points corresponding to representation points, at least one flatness criterion is determined from the distances between said regression plane and the working points from which said regression plane has been determined, and the validation process comprises a comparison between the flatness criterion and the reference plane.

13. A non-transitory computer-readable medium storing program code instructions for performing the steps of the method according to claim 1 when said non-transitory computer-readable medium is read by a computer.

14. A biometric system for analyzing an object to be authenticated as a human finger, comprising an image acquisition device adapted to acquire at least one image of an object to be authenticated as a human finger and a processing unit for determining a three-dimensional representation of said object from said image, said system also comprising a processor configured to implement the fraud detection method according to claim 1.

* * * * *